(12) United States Patent
Asamizu et al.

(10) Patent No.: US 10,317,729 B2
(45) Date of Patent: Jun. 11, 2019

(54) DISPLAY DEVICE

(71) Applicant: Sakai Display Products Corporation, Osaka (JP)

(72) Inventors: Tomohiro Asamizu, Sakai (JP); Daisuke Teragawa, Sakai (JP); Noriaki Miyoshi, Sakai (JP)

(73) Assignee: Sakai Display Products Corporation, Osaka (JP)

( * ) Notice: Subject to any disclaimer, the term of this patent is extended or adjusted under 35 U.S.C. 154(b) by 0 days.

(21) Appl. No.: 16/063,537

(22) PCT Filed: Dec. 18, 2015

(86) PCT No.: PCT/JP2015/085566
§ 371 (c)(1),
(2) Date: Jun. 18, 2018

(87) PCT Pub. No.: WO2017/104081
PCT Pub. Date: Jun. 22, 2017

(65) Prior Publication Data
US 2019/0004373 A1 Jan. 3, 2019

(51) Int. Cl.
*G02F 1/1335* (2006.01)
*G02F 1/1333* (2006.01)
*F21V 8/00* (2006.01)

(52) U.S. Cl.
CPC ..... *G02F 1/133606* (2013.01); *G02B 6/0025* (2013.01); *G02F 1/1333* (2013.01); *G02F 1/133308* (2013.01)

(58) Field of Classification Search
CPC .............. G02F 1/133308; G02F 1/133606
See application file for complete search history.

(56) References Cited

U.S. PATENT DOCUMENTS

2006/0120061 A1* 6/2006 Jang ............... G02F 1/133604
362/23.09

FOREIGN PATENT DOCUMENTS

JP 2002-169479 A 6/2002

OTHER PUBLICATIONS

International Search Report issued in PCT/JP2015/085566; dated Feb. 16, 2016.

* cited by examiner

*Primary Examiner* — Phu Vu
(74) *Attorney, Agent, or Firm* — Studebaker & Brackett PC

(57) ABSTRACT

Provided is a display device that makes it possible to enhance the uniformity of brightness distribution within a display surface. The display apparatus is provided with: a display panel having one surface on which an image is displayed; a substrate that is arranged facing the other surface of the display panel and that has a plurality of light sources mounted thereon; a rectangular diffuser plate arranged between the display panel and the substrate; and a support member that supports the peripheral edge of the diffuser plate and that comprises an opening through which light from the light sources passes. Notched sections notched to positions further inward than the edge of the opening in the support member are provided to the four corners of the diffuser plate.

4 Claims, 13 Drawing Sheets

DISPLAY DEVICE

TECHNICAL FIELD

The present invention relates to a display apparatus with a direct backlight module.

BACKGROUND ART

Recently, display apparatuses each including a liquid crystal panel as an image display section are widely used. The display apparatuses each include a backlight module on the back side of the liquid crystal panel.

Various designs are employed for arrangement of the backlight module. One example of employed backlight module arrangement is a direct arrangement of the backlight module in which a light source is located opposite to the entirety of the back surface of the liquid crystal panel. For example, Patent Literature 1 discloses a backlight device in which a cylindrical light source and a reflection body are disposed in a flat casing with an opening at an upper end thereof and a light transmission-diffusion body is disposed at the opening of the casing.

A display apparatus including a backlight device such as above displays an image on a front surface of the liquid crystal panel in a manner that light from the light source is diffused by the light transmission-diffusion body and the diffused light is allowed to pass through the liquid crystal panel while being modulated by the liquid crystal panel.

CITATION LIST

Patent Literature

[Patent Literature 1]
Japanese Patent Application Laid-Open Publication No. 2002-169479

SUMMARY OF INVENTION

Technical Problem

In Patent Literature 1 described above, the reflection body, which includes a bottom surface and a side surface having different reflection properties, is disposed on an inner surface of the casing to even out light quantities at a part of a light irradiated surface having low luminance at a part thereof having high luminance, thereby reducing unevenness in luminance.

However, in the backlight device disclosed in Patent Literature 1, light reflected by the side surface of the casing is lead to an inward region of the light irradiated surface with a result that sufficient luminance cannot be obtained at four corners of the light irradiated surface.

The present invention has been made in view of the forgoing and has its object of providing a display apparatus in which degree of evenness of luminance distribution over a display surface is increased.

Solution to Problem

A display apparatus according to the present application includes a display panel, a substrate, a diffusion plate, and a support member. The display panel has a surface on which an image is displayed. The substrate faces another surface of the display panel which is opposite to the one surface. A plurality of light sources are mounted on the substrate. The diffusion plate has a substantially rectangular shape and is disposed between the display panel and the substrate. The support member has an opening through which light from the light sources passes, and supports a peripheral portion of the diffusion plate. The diffusion plate has a chamfered edge at each of four corners of the substantially rectangular shape of the diffusion plate. At least part of the chamfered edge of the rectangular diffusion plate is located further inward than an edge of the opening of the support member.

Advantageous Effects of Invention

According to the present application, evenness of luminance distribution over the display surface can be increased.

DESCRIPTION OF EMBODIMENTS

The present invention will be described below with reference to drawings that illustrate embodiments thereof.

(First Embodiment)

Figure 1:
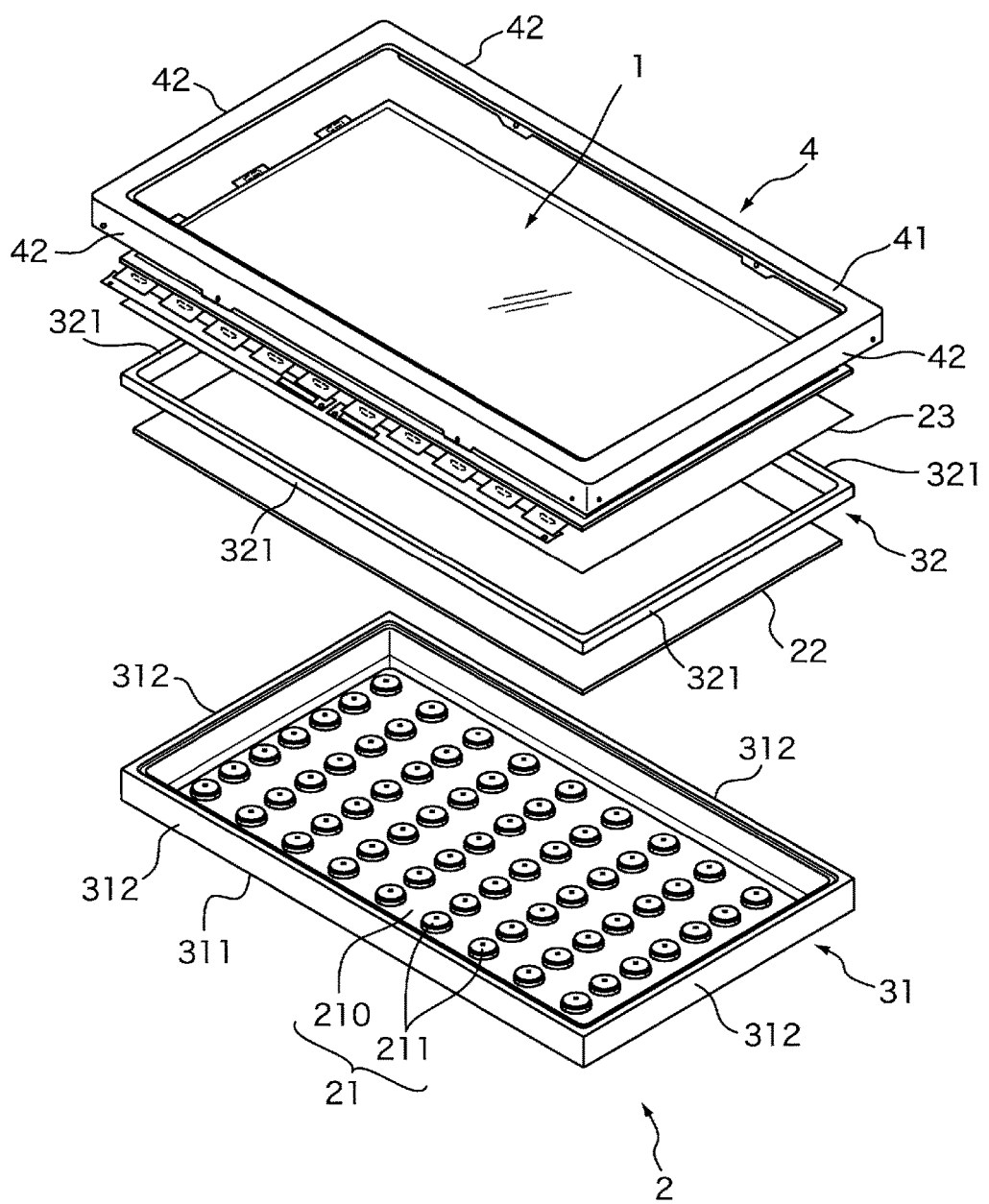
FIG. 1 is an exploded perspective view of a display apparatus according to a first embodiment.
Figure 2:
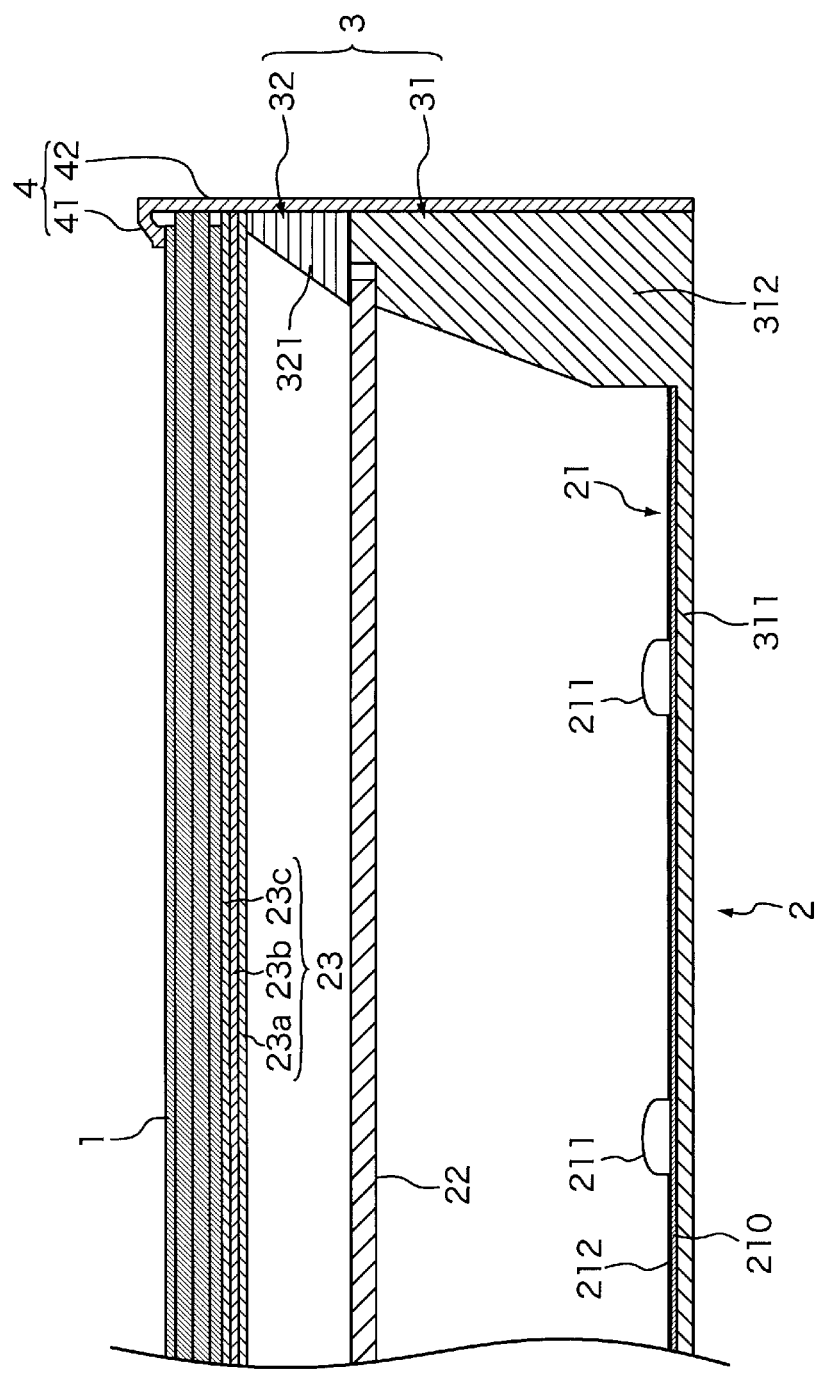
FIG. 2 is a vertical cross-sectional view of the display apparatus according to the first embodiment.

FIG. 1 is an exploded perspective view of a display apparatus according to a first embodiment. FIG. 2 is a vertical cross-sectional view of the display apparatus according to the first embodiment. The display apparatus according to the present embodiment is a liquid crystal display apparatus for example including a liquid crystal panel 1 on a front side of the liquid crystal display apparatus and a light source section 2 on a back side thereof.

The liquid crystal panel 1 is a rectangular display panel including a plurality of liquid crystal display elements arranged in a matrix for displaying an image on a front surface of the liquid crystal panel 1.

The light source section 2 is a direct backlight module that emits light from the back of the liquid crystal panel 1. The light source section 2 includes a light emitting diode (LED) substrate 21, a diffusion plate 22, and an optical sheet 23, and irradiates the liquid crystal panel 1 with light emitted from light sources (LED chips 221) on the LED substrate 21 through the diffusion plate 22 and the optical sheet 23.

The LED substrate 21 includes a rectangular substrate 210 and the plurality of LED chips 211, 211, . . . , 211 mounted on the substrate 210 at substantially regular intervals in a longitudinal direction and a short direction of the substrate 210. The LED chips 211 each are for example a package including a light emitting diode element, a phosphor covering the light emitting diode element, and an accommodation body that accommodates them. Note that the LED substrate 21 has a surface on which a reflection sheet 212 having high reflectivity is disposed. The reflection sheet 212 is preferably formed of a reflection body for example having a light reflectivity of at least 85%. Alternatively, the surface of the substrate 210 may be coated with white paint.

The diffusion plate 22 is a rectangular plate body made of a synthetic resin having high transparency, such as an acrylic resin or a polycarbonate resin and having a specific thickness. The diffusion plate 22 includes a number of diffusion particles dispersed therein, and has a function of diffusing light passing through the diffusion plate 22. That is, light of the LED chips 211 entering the diffusion plate 22 from one of surfaces of the diffusion plate 22 is diffused by the diffusion particles therein when traveling in a thickness direction of the diffusion plate 22. Part of the diffused light passes through the other surface of the diffusion plate 22, while the other part thereof is reflected toward the one surface thereof.

The optical sheet 23 is a transparent sheet having a specific optical property, and is formed of a lamination body of a plurality of sheets. The optical sheet 23 in the present embodiment is formed of a lamination body of a diffusion sheet 23a, a lens sheet 23b, and a reflective polarizing sheet 23c. Note that the number of sheets and the configuration of the sheets constituting the optical sheet 23 can be altered as appropriate according to required specification such as luminance or optical property.

The display apparatus includes a panel chassis 3 that accommodates the LED substrate 21. The panel chassis 3 in the present embodiment includes a backside panel chassis 31 that is a shallow bottomed casing and a frontside panel chassis 32 that is a frame-shaped frame body with an opening at a central part thereof.

The backside panel chassis 31 includes a rectangular bottom surface portion 311 and side walls 312. The LED substrate 21 on which the LED chips 211 are mounted is attached to the bottom surface portion 311. The side walls 312 stand upright from the peripheral edge of the bottom surface portion 311. The backside panel chassis 31 is made of for example a metal excellent in thermal conductivity, such as aluminum for radiating heat emitted from the LED chips 211. The side walls 312 each have an inclined surface that is an inner circumferential surface that is inclined obliquely outward between the bottom surface portion 311 and the diffusion plate 22 (i.e., a tapered inclined surface of each side wall 312 of which thickness gradually decreases in a height direction thereof). The side walls 312 reflect incident light toward the front side of the display apparatus. In this connection, the inclined surfaces of the side walls 312 are each preferably formed of a reflection body for example having a reflectivity of at least 85%. Alternatively, a reflection sheet having high reflectivity may be provided on the inclined surface or white paint may be applied onto a reflection surface.

The frontside panel chassis 32 is a frame-shaped frame body with an opening at a central part thereof. The frontside panel chassis 32 includes four circumferential walls 321. The frontside panel chassis 32 and the backside panel chassis 31 hold a peripheral portion of the diffusion plate 22 therebetween to support the diffusion plate 22. The circumferential walls 321 each have an inclined surface that is an inner circumferential surface inclining obliquely outward between the diffusion plate 22 and the optical sheet 23 (i.e., a tapered inclined surface of each circumferential wall 321 of which thickness gradually decreases in a height direction thereof), and reflect incident light toward the front side of the display apparatus. In this connection, the inclined surfaces of the side walls 312 are each preferably formed of a reflection body for example having a reflectivity of at least 85%. Alternatively, a reflection sheet having high reflectivity may be provided on the inclined surface or white paint may be applied onto a reflection surface.

The display apparatus further includes a frame-shaped bezel 4 that covers a peripheral portion of the liquid crystal panel 1 from the front of the display apparatus. The bezel 4 is a frame body slightly larger than the panel chassis 3, and has an opening at a central part thereof. The bezel 4 includes a frame portion 41 that covers the peripheral portion of the liquid crystal panel 1 from the front of the liquid crystal panel 1 and side walls 42 that cover outer circumferential surfaces of the panel chassis 3. When the bezel 4 is set in a state in which the diffusion plate 22 is held between the backside panel chassis 31 and the frontside panel chassis 32 and the optical sheet 23 and the liquid crystal panel 1 are placed on the frontside panel chassis 32, the frame portion 41 is in contact at an inner circumferential surface thereof with the peripheral portion of the liquid crystal panel 1 located on the front side thereof while the side walls 42 are in contact at inner circumferential surfaces thereof with respective outer circumferential surfaces of the backside panel chassis 31 and the frontside panel chassis 32. Thus, the liquid crystal panel 1 is supported together with the optical sheet 23 in a manner to be held between the frontside panel chassis 32 and the frame portion 41 of the bezel 4.

The display apparatus according to the present embodiment is configured as above. The display apparatus performs image display in a manner that light is irradiated from the back of the liquid crystal panel 1 using the light source section 2 and light transmittance of each liquid crystal display element (pixels) arranged in the liquid crystal panel 1 is adjusted by driving and controlling the liquid crystal display elements by a non-illustrated drive circuit.

Figure 3:
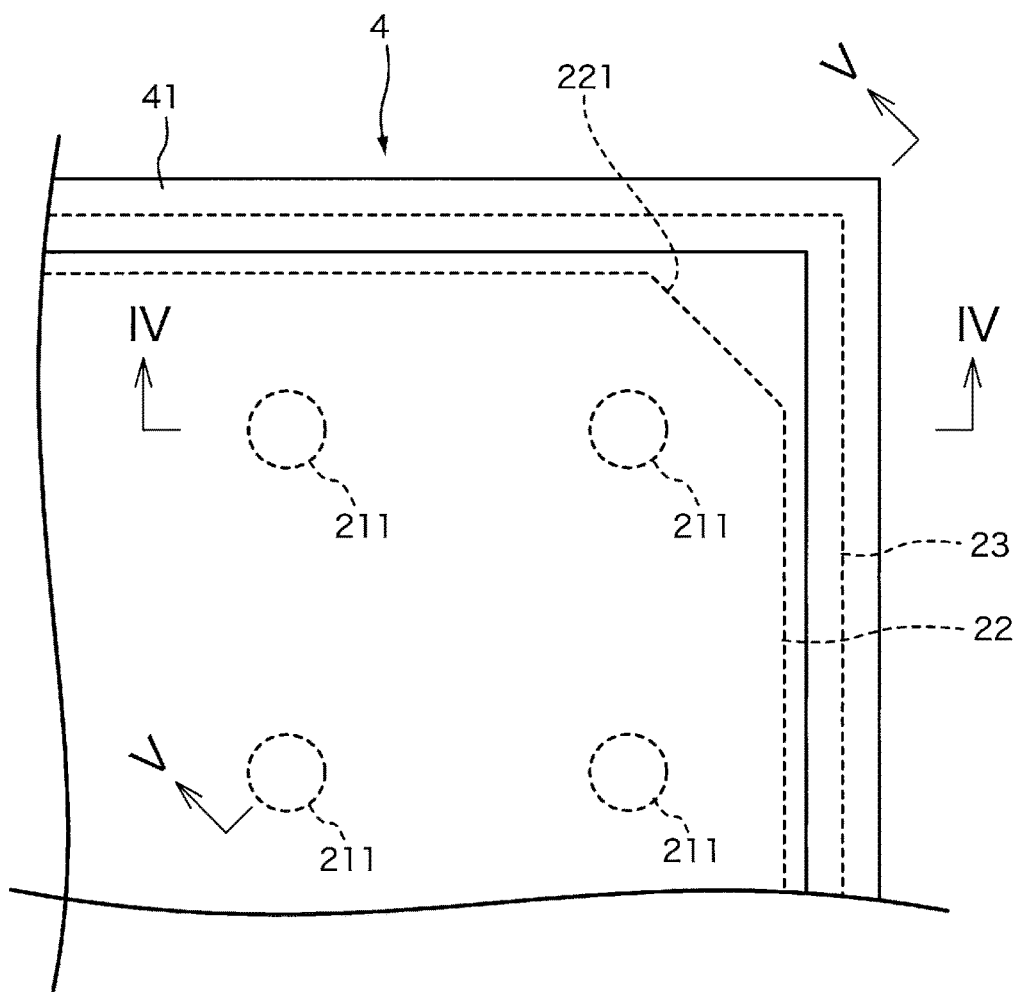
FIG. 3 is a partial front view of the display apparatus according to the first embodiment.
Figure 4:
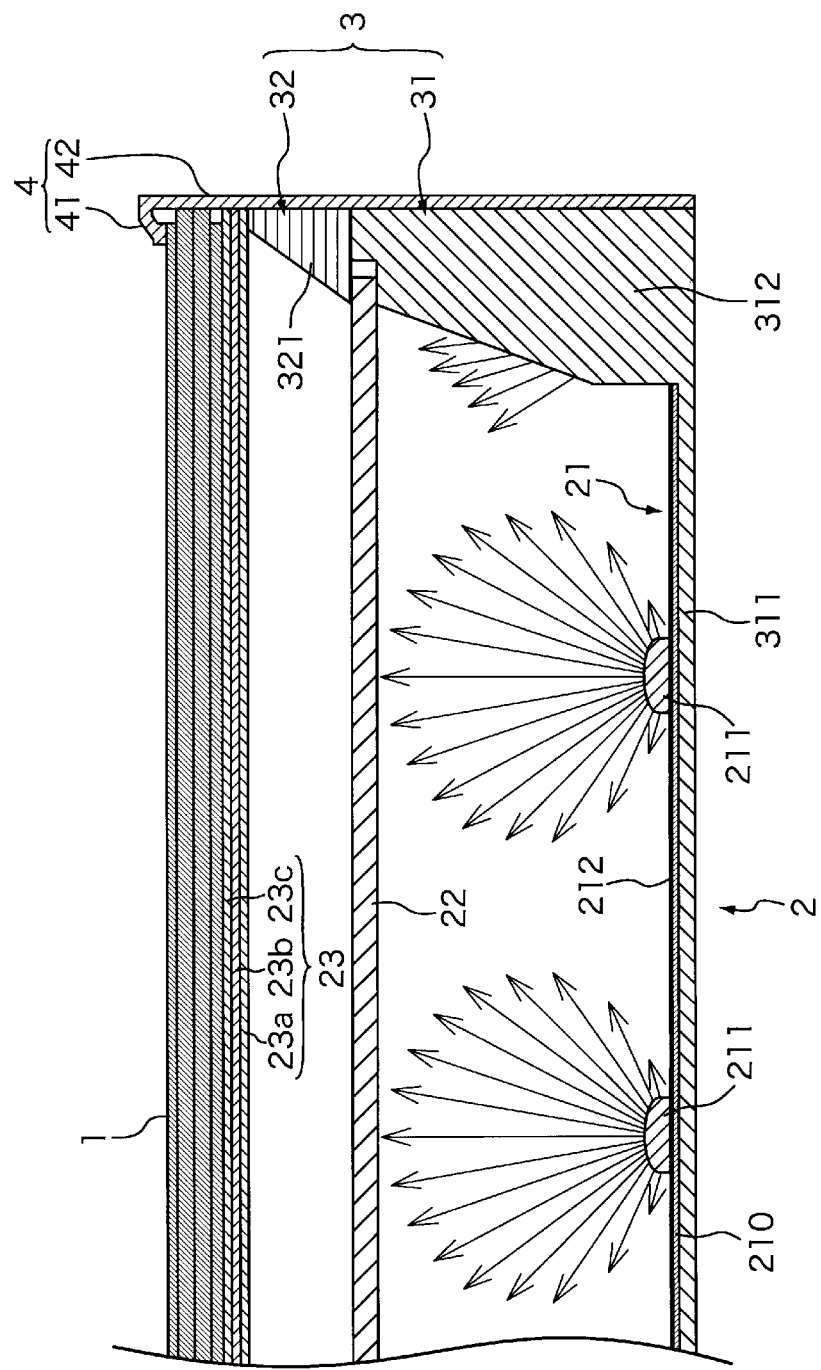
FIG. 4 is a cross-sectional view taken along a line IV-IV in FIG. 3.
Figure 5:
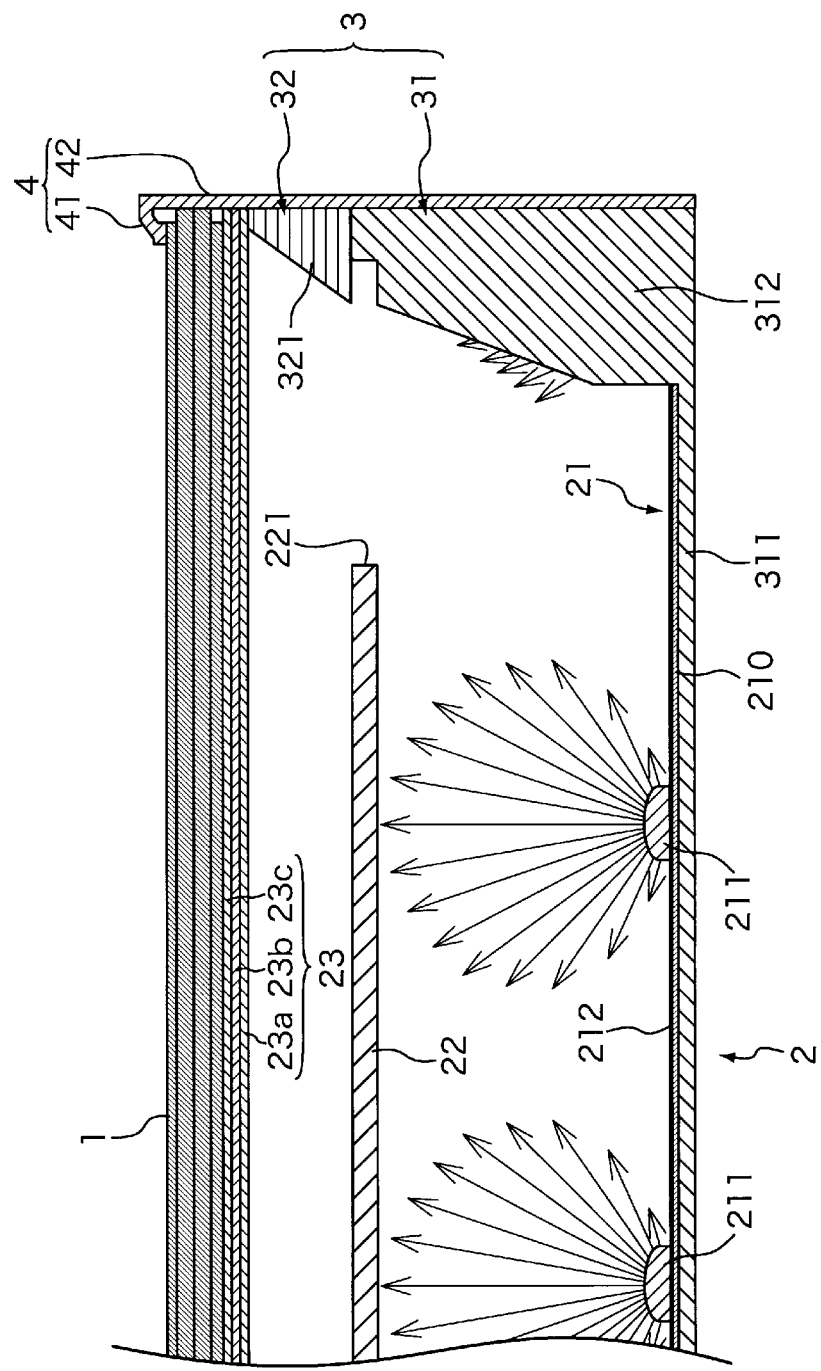
FIG. 5 is a cross-sectional view taken along a line V-V in FIG. 3.

FIG. 3 is a partial front view of the display apparatus according to the first embodiment. FIG. 4 is a cross-sectional view taken along a line IV-IV in FIG. 3. FIG. 5 is a cross-sectional view taken along a line V-V in FIG. 3. In the present embodiment, the diffusion plate 22 has a chamfered edge 221 at each of four corners thereof at a location further inward than an edge of the opening of the panel chassis 3 so as to form a gap between the diffusion plate 22 and the panel chassis 3. The size of the chamfered edge 221 is for example approximately 3 mm to 10 mm, and can be determined as appropriate according to a width of the frame portion 41.

When light from the LED chips 211, 211, . . . , 211 passes through the diffusion plate 22, the diffusion plate 22 diffuses the light using the diffusion particles therein. Therefore, the diffusion plate 22 has a function of evening out luminance distribution of light passing toward the liquid crystal panel 1 over the surface thereof. Conventionally, the distance from light sources such as LEDs to a panel chassis is longer in an oblique direction than in a vertical direction or a horizontal direction. As a result, a light quantity tends to decrease in four corner regions of a panel and therefore the four corner regions tend to be noticeably dark relatively when compared to a region of the panel other than the four corner regions.

In view of the foregoing, the chamfered edges 221 are formed at the respective four corners of the diffusion plate 22 in the present embodiment. In the above configuration, part of light from the LED chips 211 directly reaches four corner regions of the liquid crystal panel 1 without passing through the diffusion plate 22 (see FIG. 5). By contrast, light passing through the diffusion plate 22 reaches peripheral regions of the liquid crystal panel 1 other than the four corner regions (see FIG. 4).

A number of diffusion particles are dispersed in the diffusion plate 22. Therefore, part of incident light from the LED chips 211,211, . . . , 211 is reflected toward a side opposite to the liquid crystal panel 1 (back side of the apparatus) while the other part of the light thereof passes toward the liquid crystal panel 1. In the above configuration, light is not reflected toward the back side of the apparatus by the four corners of the diffusion plate 22 where the chamfered edges 221 are formed while the light quantity of light reaching the four corner regions of the liquid crystal panel 1 increases relatively when compared to a configuration without the chamfered edges 221. Furthermore, part of the light is reflected toward the back side of the apparatus by peripheral regions of diffusion plate 22 in which the chamfered edges 221 are not formed. Therefore, the light quantity of light reaching the peripheral regions other than the four corner regions of the liquid crystal panel 1 reduces relatively when compared to a configuration in which the chamfered edges 221 are formed. Thus, reduction in light quantity around the four corner regions of the liquid crystal panel 1 can be prevented and evenness of luminance distribution over the display surface of the liquid crystal panel 1 can be increased in the first embodiment.

As described above, the diffusion plate 22 has the chamfered edges 221a at the respective four corners thereof in the first embodiment. In the above configuration, the light quantity of light reaching the four corner regions of the liquid crystal panel 1 can be increased to prevent reduction in light quantity in the four corner regions. Thus, degree of evenness of luminance distribution over the surface of the liquid crystal panel 1 can be increased.

In particular, even in a display apparatus having a narrow frame that cannot sufficiently cover the peripheral portion of a panel, evenness of luminance distribution over an effective display surface can be ensured. Moreover, even in a multi-display apparatus in which a plurality of the display apparatuses according to the present embodiment are arranged side by side, dark portions at respective four corner regions of adjacent display apparatuses can be made inconspicuous.

(Second Embodiment)

The chamfered edges 221 are formed in the respective four corners of the diffusion plate 22 in the first embodiment. However, additional chamfered edges may be formed in respective four corners of the optical sheet 23.

In a second embodiment, a configuration in which chamfered edges are formed in the respective four corners of the optical sheet 23 will be described. Note that an overall configuration of a display apparatus in the second embodiment is the same as that in the first embodiment. Therefore, description thereof is omitted.

Figure 6:
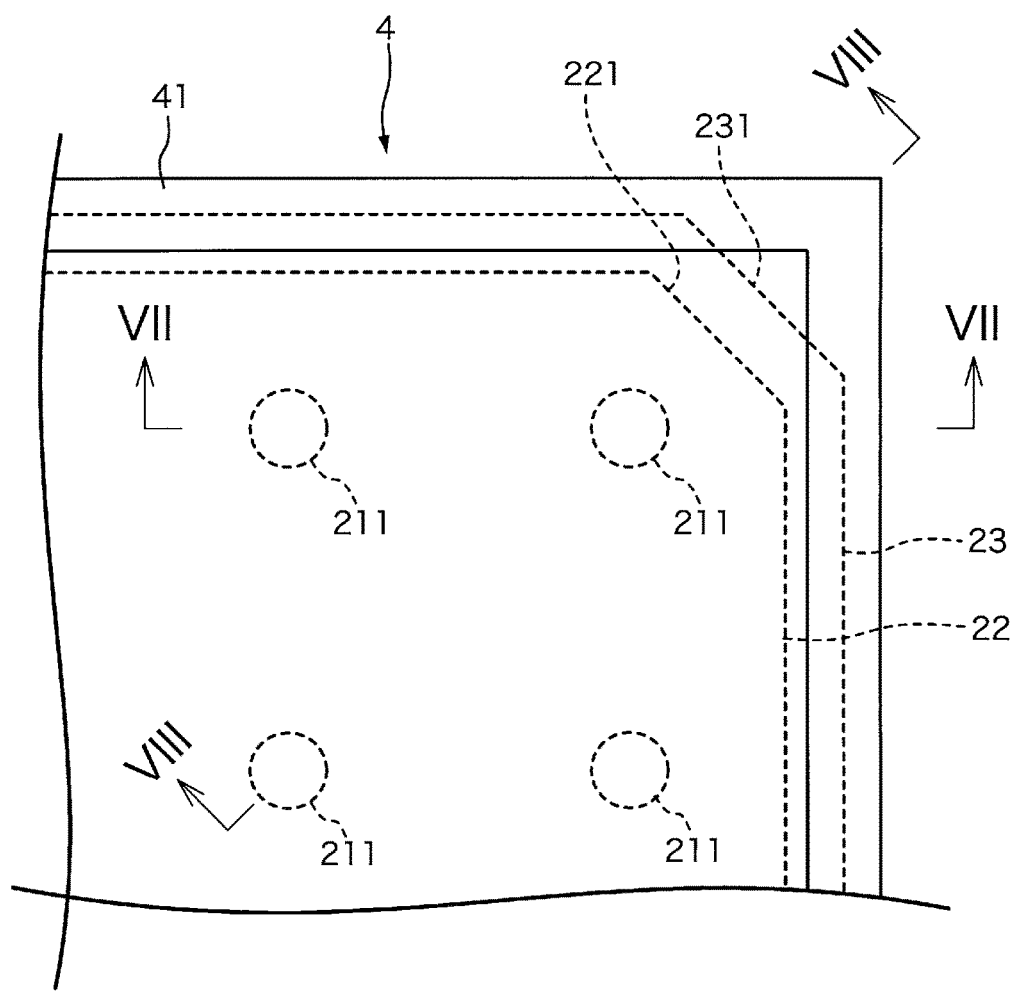
FIG. 6 is a partial front view of a display apparatus according to a second embodiment.
Figure 7:
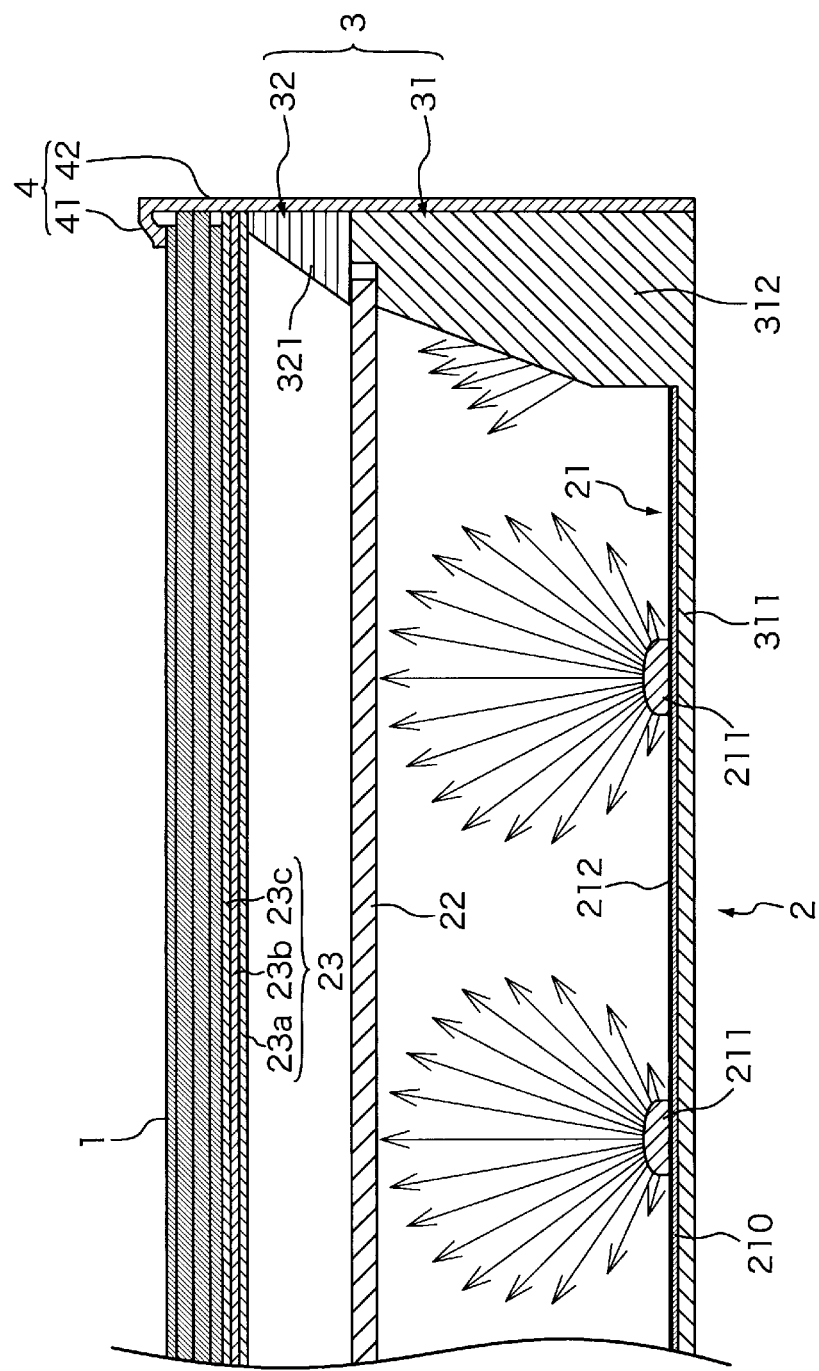
FIG. 7 is a cross-sectional view taken along a line VII-VII in FIG. 6.
Figure 8:
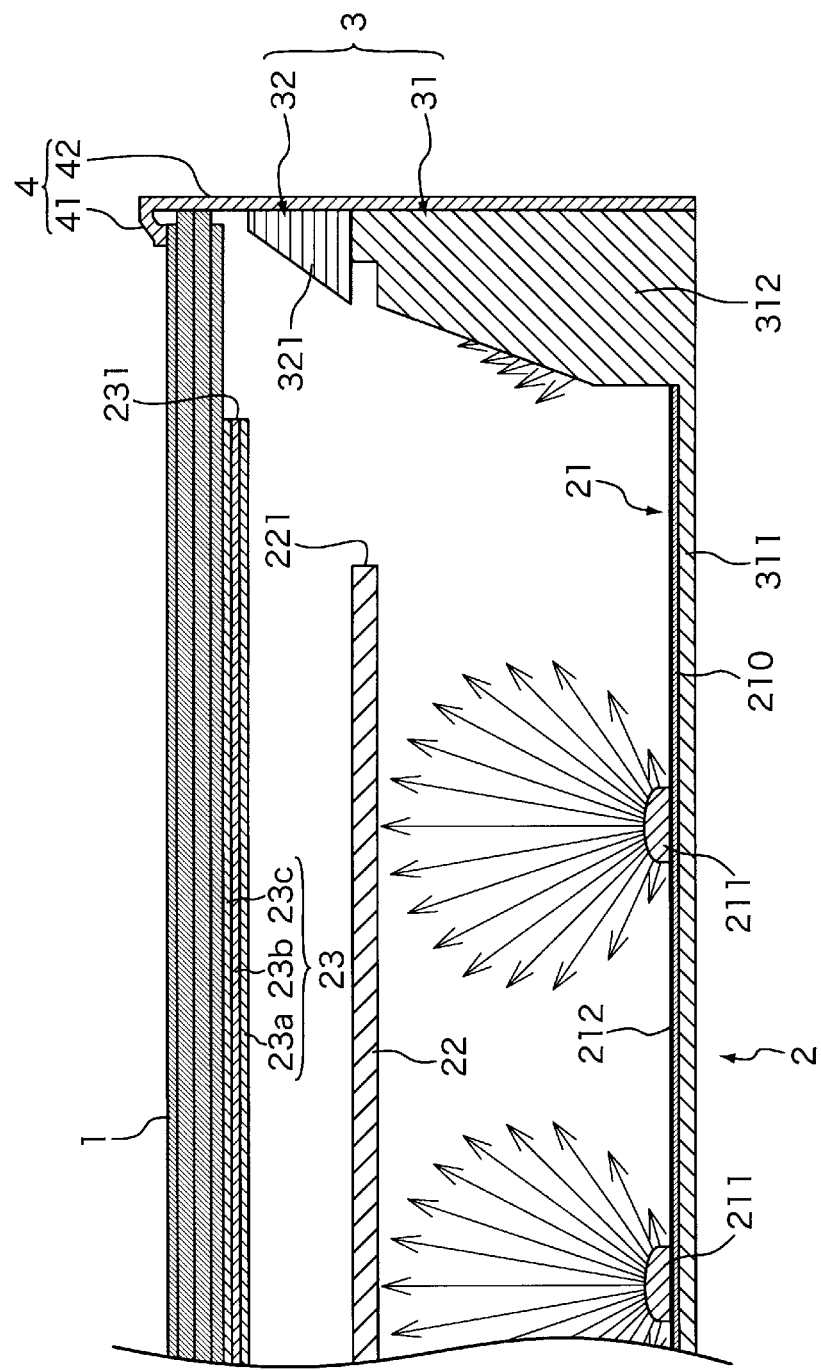
FIG. 8 is a cross-sectional view taken along a line VIII-VIII in FIG. 6.

FIG. 6 is a partial front view of the display apparatus according to the second embodiment. FIG. 7 is a cross-sectional view taken along VII-VII in FIG. 6. FIG. 8 is a cross-sectional view taken along a line VIII-VIII in FIG. 6. In the second embodiment, the diffusion plate 22 has the chamfered edge 221 at each of the four corners thereof at a location further inward than an edge of the opening of the panel chassis 3 so as to form a gap between the diffusion plate 22 and the panel chassis 3. The size of the chamfered edge 221 is for example approximately 3 mm to 10 mm, and can be determined as appropriate according to the width of the frame portion 41.

In addition, in the second embodiment, the optical sheet 23 has a chamfered edge 231 at each of the four corners thereof at a location further inward than the edge of the opening of the panel chassis 3. The chamfered edge 231 is slightly smaller than the chamfered edge 221 in the diffusion plate 22, and has for example a size of approximately 2 mm to 5 mm. Note that the size of the chamfered edges 231 is preferably determined as appropriate according to the width of the frame portion 41.

As describes above, the distance from light sources such as LEDs to a panel chassis is typically longer in an oblique direction than in a vertical direction or a horizontal direction. As a result, the light quantity tends to decrease in the four corner regions of a panel and therefore the four corner regions tend to be noticeably dark relatively when compared to a region of the panel other than the four corner regions.

In view of the foregoing, the chamfered edges 221 and 231 are formed in the respective four corners of the diffusion plate 22 and the optical sheet 23 in the present embodiment. In the above configuration, part of light from the LED chips 211 directly reaches the four corner regions of the liquid crystal panel 1 without passing through the optical sheet 23 (see FIG. 8). By contrast, light passing through the optical sheet 23 reaches the peripheral regions of the liquid crystal panel 1 other than the four corner regions (see FIG. 7).

Part of light entering the optical sheet 23 passes toward the liquid crystal panel 1, while the other part of the light is reflected toward a side opposite to the liquid crystal panel 1 (back side of the apparatus). Therefore, light is not reflected toward the back side of the apparatus by the four corners of the optical sheet 23 where the chamfered edges 231 are formed. By contrast, the light quantity of light reaching the four corner regions of the liquid crystal panel 1 increases relatively when compared to a configuration without the chamfered edges 231. Furthermore, part of the light is reflected toward the back side of the apparatus by peripheral regions of the optical sheet 23 in which the chamfered edges 231 are not formed. Therefore, the light quantity of light reaching the peripheral regions other than the four corner regions of the liquid crystal panel 1 reduces relatively when compared to a configuration in which the chamfered edges 231 are formed. Thus, reduction in light quantity around the four corner regions of the liquid crystal panel 1 can be prevented and evenness of luminance distribution over the display surface of the liquid crystal panel 1 can be increased in the second embodiment.

As described above, the diffusion plate 22 and the optical sheet 23 have the chamfered edges 221 and 231 in the respective four corners thereof in the second embodiment. In the above configuration, the light quantity of light reaching the four corner regions of the liquid crystal panel 1 can be increased to prevent reduction in light quantity in the four corner regions. Thus, evenness of luminance distribution over the surface of the liquid crystal panel 1 can be increased. In particular, even in a display apparatus having a narrow frame that cannot sufficiently cover the peripheral portion of a panel, evenness of luminance distribution over the effective display surface can be ensured.

(Third Embodiment)

In a third embodiment, a configuration will be described in which each of the chamfered edges 231 has a size that differs among the sheets constituting the optical sheet 23.

Note that an overall configuration of a display apparatus in the third embodiment is the same as that in the first embodiment and therefore description thereof is omitted.

Figure 9:
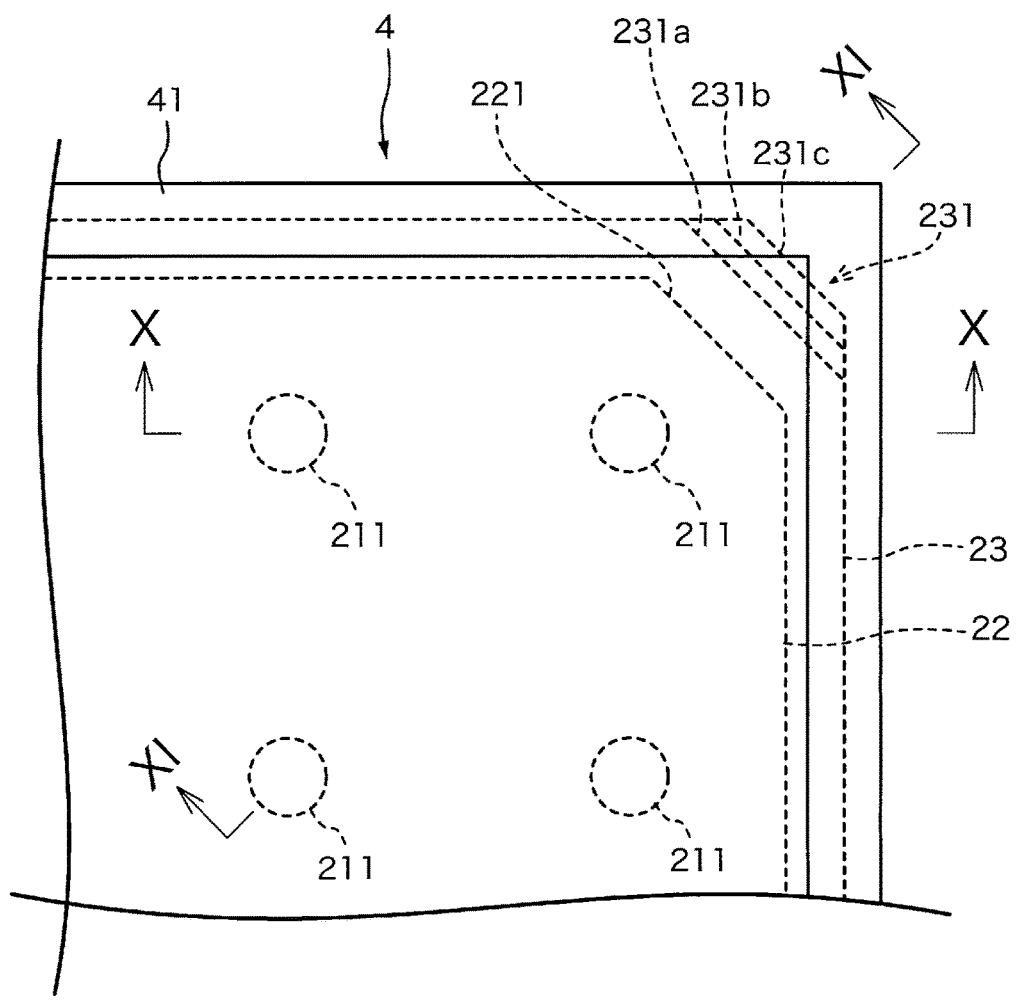
FIG. 9 is a partial front view of a display apparatus according to a third embodiment.
Figure 10:
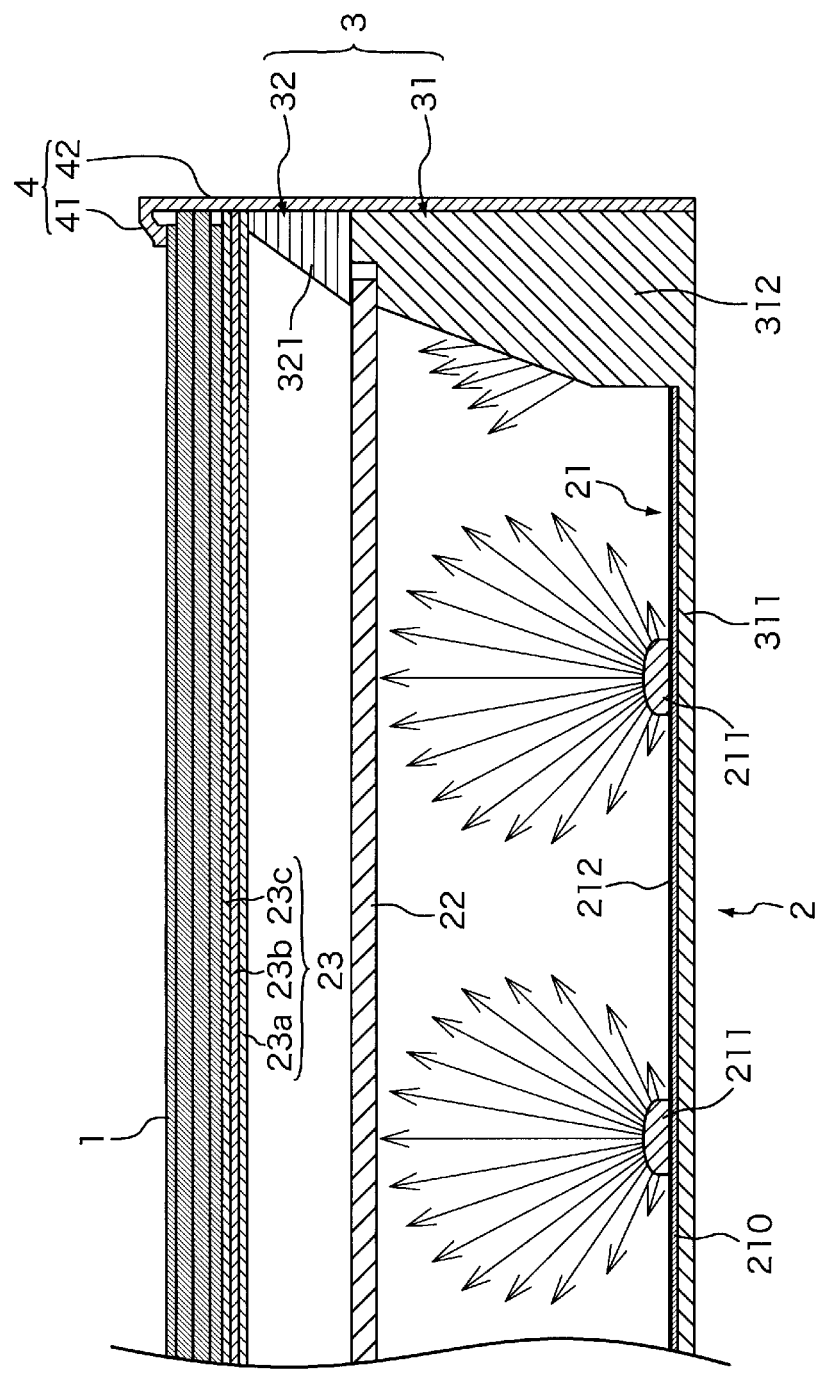
FIG. 10 is a cross-sectional view taken along a line X-X in FIG. 9.
Figure 11:
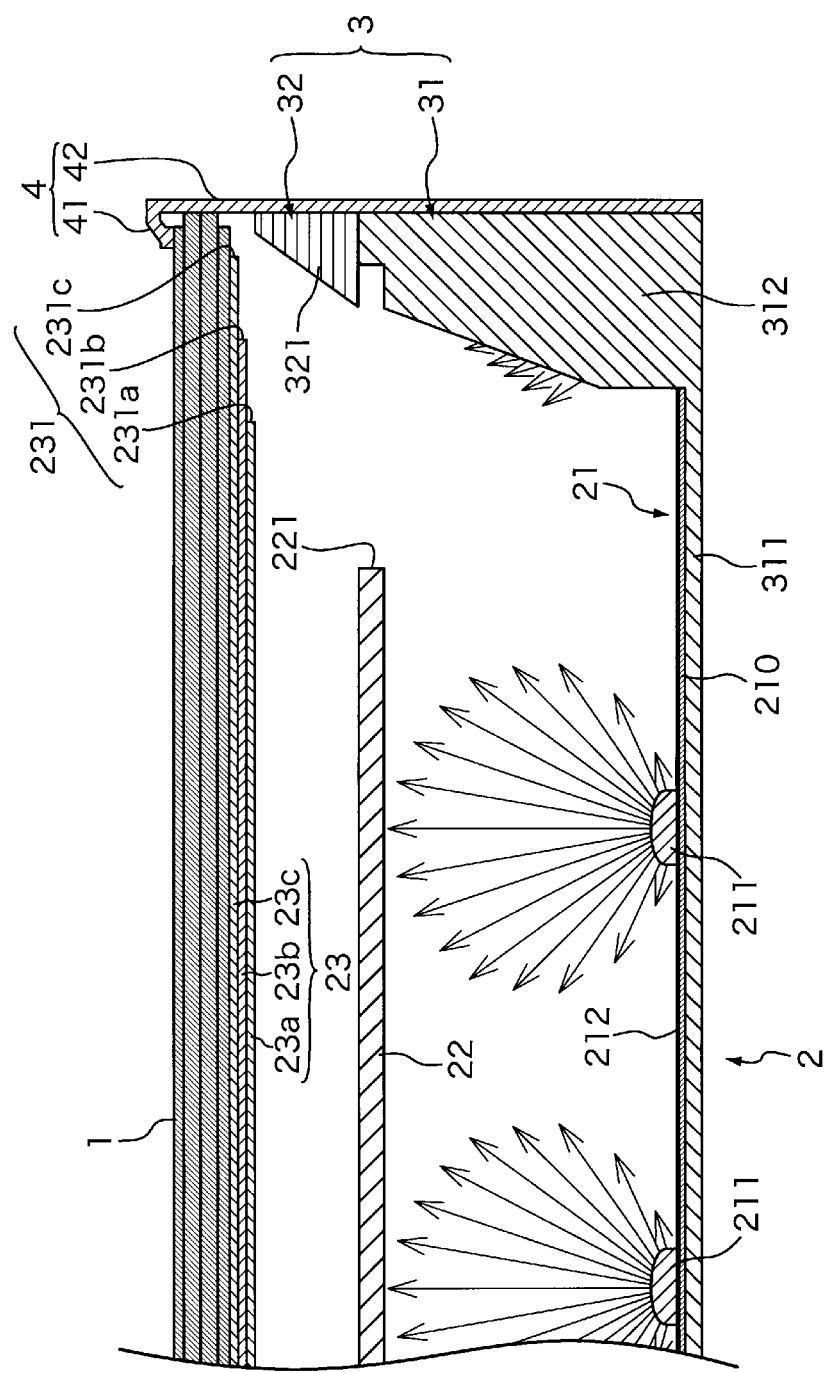
FIG. 11 is a cross-sectional view taken along a line XI-XI in FIG. 9.

FIG. 9 is a partial front view of the display apparatus according to the third embodiment. FIG. 10 is a cross-sectional view taken along a line X-X in FIG. 9. FIG. 11 is a cross-sectional view taken along a line XI-XI in FIG. 9. In the third embodiment, the diffusion plate 22 has the chamfered edge 221 at each of the four corners thereof at a location further inward than the edge of the opening of the panel chassis 3 so as to form a gap between the diffusion plate 22 and the panel chassis 3. The size of the chamfered edge 221 is for example approximately 3 mm to 10 mm, and can be determined as appropriate according to the width of the frame portion 41.

The optical sheet 23 also has a chamfered edge 231 at each of the four corners thereof at a location further inward than the edge of the opening of the panel chassis 3 in the third embodiment. The chamfered edge 231 is slightly smaller than the chamfered edge 221 in the diffusion plate 22, and has for example a size of approximately 2 mm to 5 mm. Note that the size of the chamfered edges 231 is preferably determined as appropriate according to the width of the frame portion 41.

Moreover, in the third embodiment, the size of each of the chamfered edge 231 differs among the sheets constituting the optical sheet 23. The size of the chamfered edge 231 decreases in order from a sheet located the most closely to the diffusion plate 22. That is, the size of the chamfered edge 231 in the optical sheet 23 decreases in the order of a chamfered edge 231a in the diffusion sheet 23a, a chamfered edge 231b in the lens sheet 23b, and a chamfered edge 231c in the reflective polarizing sheet 23c in an example illustrated in FIG. 11.

In the above configuration, the light quantity of light reaching the four corner regions of the liquid crystal panel 1 can be increased to prevent reduction in light quantity in the four corner regions. Thus, evenness of luminance distribution over the surface of the liquid crystal panel 1 can be increased. In particular, even in a display apparatus having a narrow frame that cannot sufficiently cover the peripheral portion of a panel, evenness of luminance distribution over the effective display surface can be ensured.

Moreover, the chamfered edge 231 in the optical sheet 23 has the size that differs among the sheets constituting the optical sheet 23 in the third embodiment. Thus, steps at the chamfered edge 231 can be made inconspicuous.

Figure 12:
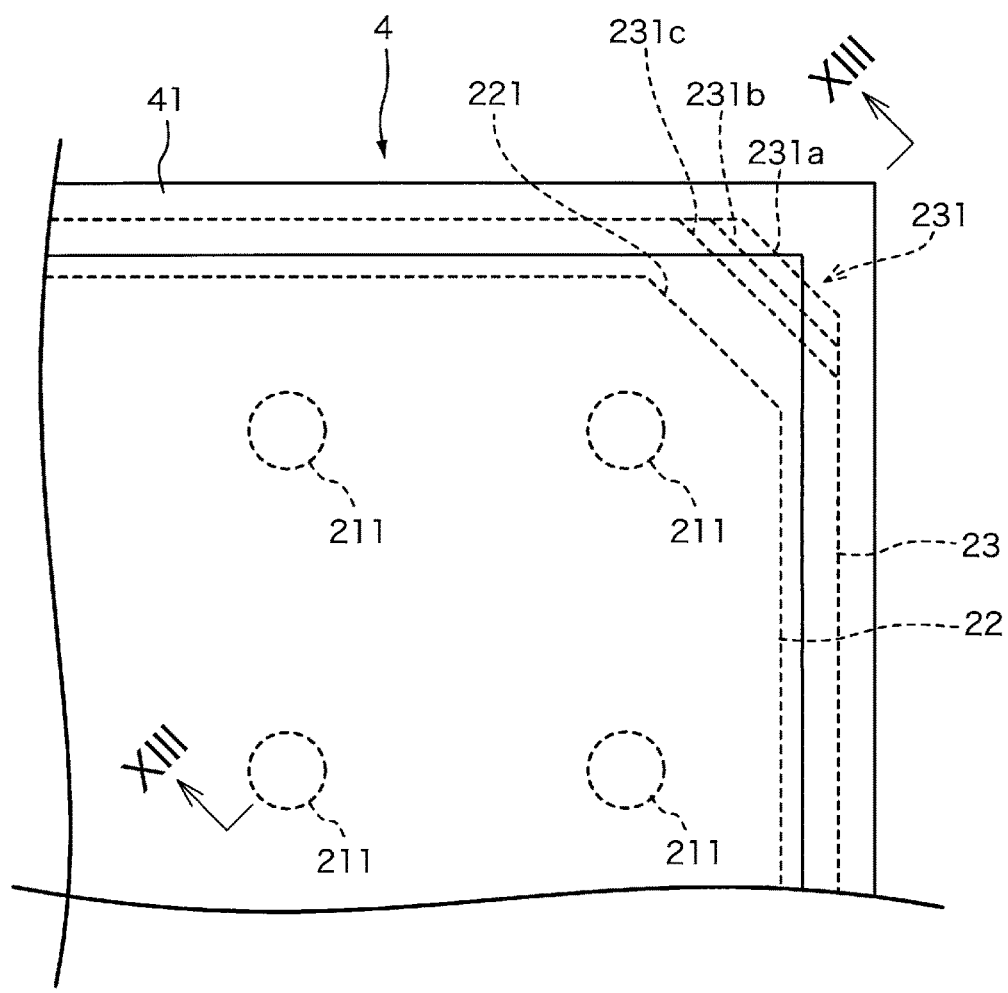
FIG. 12 is a partial front view of a display apparatus according to a variation of the third embodiment.
Figure 13:
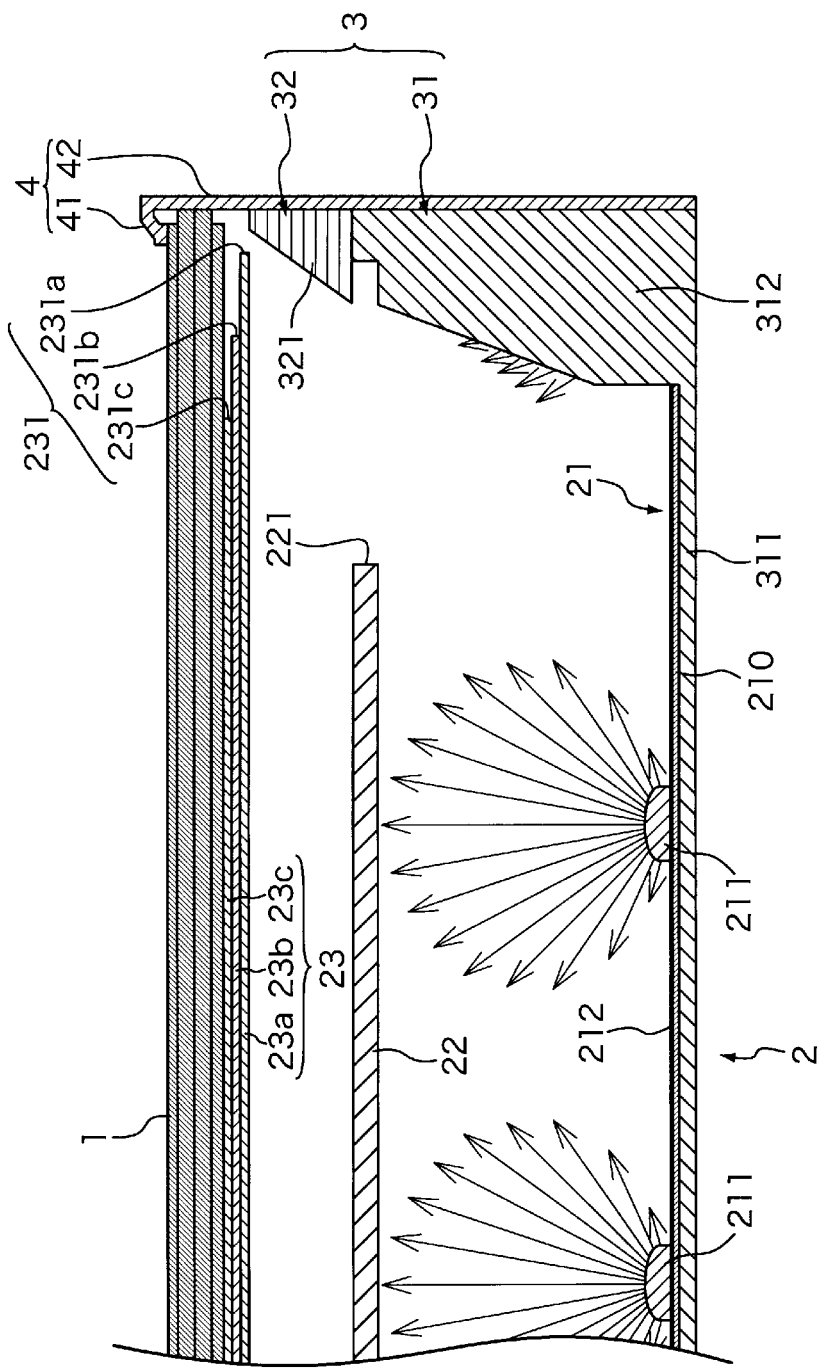
FIG. 13 is a cross-sectional view taken along a line XIII-XIII in FIG. 12.

Note that although the third embodiment describes a configuration in which each chamfered edge 231 decreases in size in order from the chamfered edge of a sheet located the most closely to the diffusion plate 22, it is possible that the chamfered edge 231 decreases in size in order from the chamfered edge of a sheet located the most closely to the liquid crystal panel 1. FIG. 12 is a partial front view illustrating a display apparatus according to a variation of the third embodiment. FIG. 13 is a cross-sectional view taken along a line XIII-XIII In the variation illustrated in FIGS. 12 and 13, chamfered edges 231 in the optical sheet 23 each have a size that differs among the sheets constituting the optical sheet 23. The size of the chamfered edge 231 decreases in order from a sheet located the most closely to the liquid crystal panel 1. That is, the size of the chamfered edge 231 in the optical sheet 23 in the variation decreases in the order of the chamfered edge 231c in the reflective polarizing sheet 23c, the chamfered edge 231b in the lens sheet 23b, and the chamfered edge 231a in the diffusion sheet 23a.

Even in the configuration as above, reduction in light quantity at the four corner regions of the liquid crystal panel 1 can be prevented and steps of the chamfered edges 231 in the optical sheet 23 can be made inconspicuous.

The embodiments disclosed herein are mere examples in all aspects and should not be taken as any limitation. The scope of the present invention is presented in appended claims rather than the above description, and meaning equivalent to the scope of claims and any variations within the scope are intended to be encompassed. Any combinations of technical features described in respective embodiments are possible.

REFERENCE SINGS LIST 1 liquid crystal panel
2 light source section
3 panel chassis
4 bezel
21 LED substrate
22 diffusion plate
23 optical sheet
31 backside panel chassis
32 frontside panel chassis
211 LED chip
212 reflection sheet
221 chamfered edge
231 chamfered edge
231a, 231b, 231c chamfered edge

The invention claimed is:

1. A display apparatus comprising:
a display panel having one surface on which an image is displayed;
a substrate on which a plurality of light sources are mounted, the substrate facing another surface of the display panel which is opposite to the one surface;
a diffusion plate having a substantially rectangular shape and being disposed between the display panel and the substrate; and
a support member having an opening through which light from the light sources passes and configured to support a peripheral portion of the diffusion plate, wherein
the diffusion plate has a chamfered edge at each of four corners of the substantially rectangular shape of the diffusion plate, at least part of the chamfered edge of the diffusion plate being located further inward than an edge of the opening of the support member.

2. The display apparatus according to claim 1, further comprising
an optical sheet having a substantially rectangular shape and being disposed between the diffusion plate and the display panel, a peripheral portion of the optical sheet being supported by the support member, wherein
the optical sheet has chamfered edges at respective four corners of the substantially rectangular shape of the optical sheet, at least part of each of the chamfered edges of the optical sheet being located further inward than the edge of the opening of the support member.

3. The display apparatus according to claim 2, wherein the optical sheet includes a plurality of laminated optical sheet members, the laminated optical sheet members each have chamfered edges, the chamfered edges thereof each corresponding to one of the chamfered edges of the optical sheet, and an area of a cut end of each of the chamfered edges in one optical sheet member among the laminated optical sheet members is smaller than that in another optical sheet member among the laminated optical sheet members, the another optical sheet member being located adjacent to the one optical sheet member and closer to the diffusion plate than the one optical sheet member.

4. The display apparatus according to claim 2, wherein the optical sheet include a plurality of laminated optical sheet members, the laminated optical sheet members each have chamfered edges, the chamfered edges thereof each corresponding to one of the chamfered edges of the optical sheet, and an area of a cut end of each of the chamfered edges in one optical sheet member among the laminated optical sheet members is smaller than that in another optical sheet member among the laminated optical sheet members, the another optical sheet member being located adjacent to the one optical sheet member and closer to the display panel than the one optical sheet member.

* * * * *